United States Patent [19]

Kanaiwa

[11] 4,081,604
[45] Mar. 28, 1978

[54] SUPERPOSITION RECORDING APPARATUS

[75] Inventor: Kiyoshi Kanaiwa, Machida, Japan

[73] Assignee: Canon Kabushiki Kaisha, Tokyo, Japan

[21] Appl. No.: 719,677

[22] Filed: Sep. 1, 1976

[30] Foreign Application Priority Data

Sep. 5, 1975 Japan .............................. 50-107826

[51] Int. Cl.² .................... G06F 3/12; G06F 7/32; G06F 13/00; H04L 21/00
[52] U.S. Cl. ................................ 178/30; 101/93.04; 178/15; 340/324 AD
[58] Field of Search .................. 346/108; 178/30, 15; 101/426, DIG. 13, 93.04; 340/172.5, 324 A, 324 AD

[56] References Cited

U.S. PATENT DOCUMENTS

| 3,911,818 | 10/1975 | MacIlvaine | 101/426 |
| 4,007,442 | 2/1977 | Findley et al. | 178/30 |

*Primary Examiner*—Thomas A. Robinson

*Attorney, Agent, or Firm*—Fitzpatrick, Cella, Harper & Scinto

[57] ABSTRACT

A superposition recording apparatus comprises a first read-out unit for reading first coded recording information from a first storage medium, a first memory for storing the first recording information read by the first read-out unit, a first dot signal generator to which the first coded recording information stored in the first memory is applied to thereby produce dot signals to be recorded, a second read-out unit for reading second coded recording information from a second storage medium, a second memory for storing the second recording information read by the second read-out unit, a second dot signal generator to which the first coded recording information stored in the second memory is applied to thereby produce dot signals to be recorded, and a recording signal generator for combining together the dot signals provided from the first and second dot signal generators to form recording signals for successively controlling the recording of first and second information on a recording medium.

22 Claims, 11 Drawing Figures

| FIG. 2A | FIG. 2B |

SUPERPOSITION RECORDING APPARATUS

BACKGROUND OF THE INVENTION a. Field of the Invention

This invention relates to a superposition recording apparatus for recording a plurality of types of information in superposed relationship with one another, and further to a superposition recording apparatus for recording a plurality of types of information converted into the form of electrical signals.

b. Description of the Prior Art

In order to have character information (this term is herein used in its broadest sense and includes numerals, symbols, etc. as well) and form information (this term is herein used in its broadest sense and includes frame lines and ruled lines as well as prescribed special patterns such as trademarks and the like) formed on a single sheet of recording paper in superposed relationship with each other, it would occur to mind to use a method whereby character information is recorded on recording paper previously provided with a form as has heretofore been done with line printers. However, if such a method is resorted to, it will be necessary that when there is a number of forms to be recorded, various types of recording paper matching these forms be prepared and this will mean a huge quantity of recording paper to be kept for use and, in addition, the need to interchange the recording paper each time the form is changed.

An alternative method which might be available is the method disclosed in our U.S. Patent application Ser. No. 616,675 wherein not only character information (coded signals indicative of characters) but also form information (coded signals indicative of forms) are previously incorporated in the output information from an electronic computer while a pattern generator capable of generating recording patterns of characters or forms in response to application of the coded signals indicative of characters or forms is provided within a recording apparatus and the output information from the electronic computer is successively applied to the pattern generator in the recording apparatus, whereby character information and form information may be recorded on a single recording medium. However, the output of the electronic computer having form information so incorporated therein results in a special form of output signals and this means the loss of the interchangeability of magnetic tapes heretofore used with conventional line printers.

Also, the number of codes allotted to the patterns making the forms is limited and this reduces the degree of freedom of the forms.

SUMMARY OF THE INVENTION

The present invention intends to eliminate the above-noted disadvantages peculiar to the prior art and to provide a recording apparatus in which a form information read-out arrangement and a processing system for processing the information read by the form information read-out arrangement are provided discretely from a character information read-out arrangement and a processing system for processing the character information read by the character information read-out arrangement so that the form information may be read and processed by a system entirely separate from the character information system. Thus, the recording apparatus of the present invention may use magnetic tapes containing the information to be recorded and put out by a conventional line printer, and may also use the codes for form information independently of the codes for character information. The present apparatus can record form information and character information on a single sheet of recording paper at the same time.

It is therefore an object of the present invention to provide a superposition recording apparatus which is very easily capable of recording desired forms.

It is another object of the present invention to provide a superposition recording apparatus which may use a number of forms.

It is still another object of the present invention to provide a superposition recording apparatus which effects recording of information on a recording medium by means of dots.

Other objects and effects of the present invention will become more fully apparent from the following detailed description of the invention taken in conjunction with the accompanying drawings.

DESCRIPTION OF THE PREFERRED EMBODIMENTS

Figure 1:
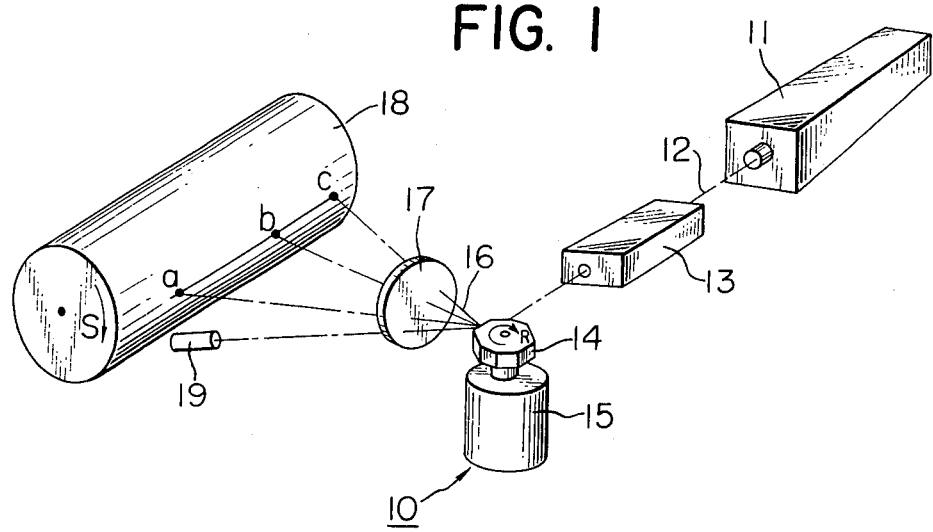
FIG. 1 is a perspective view of the recording unit to which the present invention is applied.

Referring to FIG. 1 which is a perspective view showing the recording unit 10 of the superposition recording apparatus according to the present invention, a laser beam 12 generated from a laser oscillator 11 is directed to the input opening of a modulator 13. The modulator 13 may be a conventional acousto-optical modulator utilizing the acousto-optical effect or a conventional electro-optical modulator utilizing the electro-optical effect. In the modulator 13, the laser beam is modulated strongly or weakly in accordance with an input signal to the modulator 13. The modulator 13 may be omitted if the laser oscillator 11 is a semiconductor laser or a gas laser of the type which permits current modulation or an internal modulation type laser which has a modulating element incorporated in the path of oscillated light.

The laser beam so modulated impinges on a polygonal rotatable mirror 14 having a plurality of mirrored surfaces. If required, the laser beam from the modulator 13 may be made to impinge on the polygonal rotatable mirror 14 after the beam has its diameter expanded by a beam expander while remaining to be a parallel beam. The polygonal rotatable mirror 14 is mounted on a shaft supported by a high-precision bearing (for example, a pneumatic bearing) and driven by a constant speed motor 15 (such as a hysteresis synchronous motor or DC servomotor). The laser beam 16 horizontally swept by the polygonal rotatable mirror 14 is imaged as a spot on a photosensitive drum 18 by an image formation lens 17 having an f-θ characteristic. With common image formation lenses, if the angle of incidence of the light ray is θ, the position r whereat the image is formed on the image plane is defined by the relation $$r = f \tan \theta \ldots \quad (1),$$

where f is the focal length of the image formation lens. Thus, the laser beam 16 reflected by a predetermined polygonal rotatable mirror 14 as in the present embodiment has its angle of incidence on the image formation lens 17 variable as a linear function with time. Therefore, the velocity of movement of the spot formed on the surface of the photosensitive drum 18 which is the image plane is nonlinearly varied and not constant. That is, the velocity of movement of the spot is increased at a point whereat the angle of incidence is greater. Therefore, if the laser beam is scanned at a predetermined time interval and the row of spots is put on the photosensitive drum 18, the space interval between adjacent ones of those spots will be wider toward the opposite ends than in the middle portion. To avoid occurrence of such a phenomenon, the image formation lens 17 is designed to have a characteristic represented by $$r = f \cdot \theta \ldots \quad (2)$$

Such an image formation lens is called the $f-\theta$ lens.

Further, where a parallel beam is imaged in the form of a spot by an image formation lens, the minimum diameter dmin of the spot is given by $$dmin = 2.44 \frac{\lambda f}{A} \quad (3),$$

where λ is the wavelength of the light used and A the diameter of the entrance aperture of the image formation lens. Thus, if f and λ are constant, a greater A will result in a smaller spot diameter dmin. The beam expander previously mentioned is used to provide such an effect. Thus, where the necessary dmin may be obtained with the beam diameter of the beam from the laser oscillator maintained as it is, the beam expander may be omitted.

A beam detector 19 is provided which comprises a small entrance slit and a quickly responsive photoelectric conversion element (for example, a PIN diode). The beam detector 19 serves to detect the position of the laser beam 16 swept and the detection signal produced thereby determines the timing for starting the input signal to the modulator 13 to impart desired light information to the photosensitive drum 18. By this, an error in dividing accuracy of the respective reflecting surface of the polygonal rotatable mirror 15 and an offset in synchronization between the horizontal signals resulting from irregularity of rotation of the polygonal mirror may be greatly reduced to ensure image formation of good quality which, at the same time, the accuracy required of the polygonal rotatable mirror 15 and of the drive motor 16 may have a wider range of allowance which will in turn mean greater technical ease and lower cost of the manufacture.

The laser beam modulated and deflected in the manner described above is projected upon the photosensitive drum 18 to form thereon a latent image, which may then be visualized through an electrophotographic process, thereafter transferred and fixed onto a transfer medium (not shown) which may comprise plain paper, and finally put out as a hard copy. Such a printing process is widely known in the art of electrophotography and need not be described in detail.

Figure 2A:
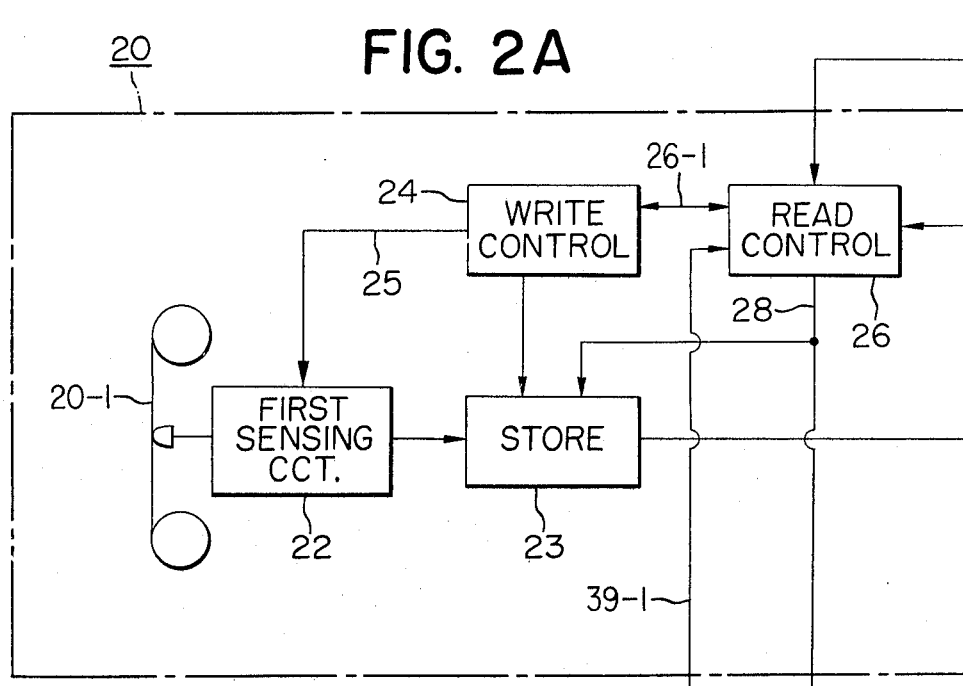
FIGS. 2A and B form a block diagram of the superposition recording apparatus according to an embodiment of the present invention.
Figure 2A:
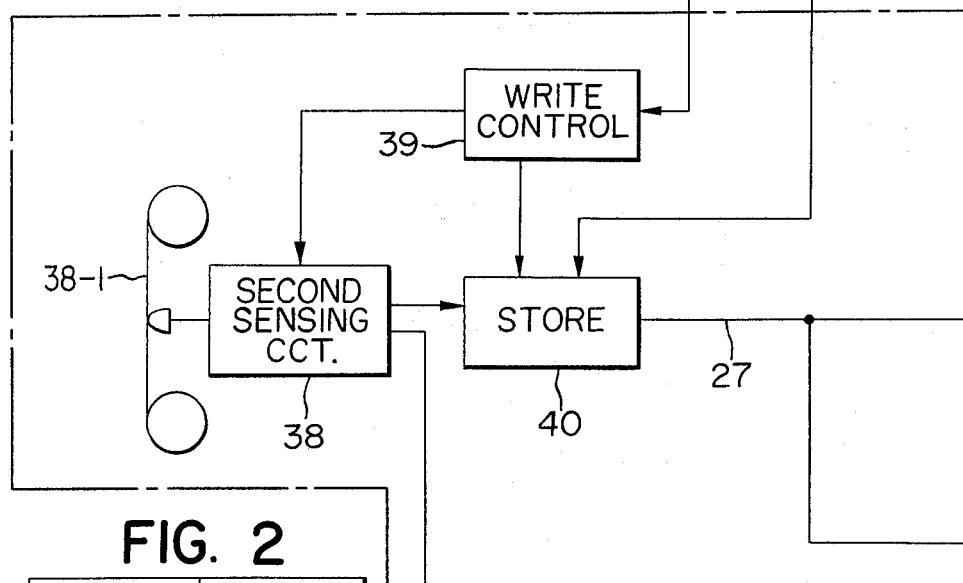

FIGS. 2A and B show a signal generating signal circuit for generating modulation signals (recording signals) to be applied to the modulator 13 of such recording unit 10. Designated by 20 is a system dealing with the reading and treatment of character information (hereinafter called the character information system), and designated by 21 is a system dealing with the reading and treatment of form information (hereinafter called the form information system). These systems are independent of each other and their outputs are simply added together and, therefore, the two systems may use entirely discrete codes or may be made to read different types of information separately from each other.

Now, the character information system will be described. Designated by 22 is a first sensing circuit for reading character information formed of coded signals in accordance with a coding system, such as EBCDIC, ASCII or the like, from an electronic computer or a first storage medium 20-1 such as a magnetic tape storing therein the output of the electronic computer. The character information so read by the first sensing circuit 22 is successively written and stored in a first store 23 having a predetermined memory capacity, for example, a sufficient memory capacity to store the information corresponding to one page of A4-size recording paper (9K bytes), under the control of a write control circuit 24. (The first store 23 may comprise, for example, a shift register or a random access memory of great capacity.) If a predetermined volume of information has been so read, a detection signal is sent to the first sensing circuit 22 over a signal line 25 to deenergize the first sensing circuit. Such detection signal is also applied to a read control 26 over a signal line 26-1, but because a detection signal is being applied from a write control 39, later described, to the read control 26 over a signal line 39-1, in other words, because detection signal is present on the signal lines 26-1 and 39-1 at the same time, the reading of the information from the first store 23 is instructed by a signal line 28. Of course, simultaneously therewith, the reading of the information from a second store 40, later described, is also instructed. When such instructions are given, the read control 26 begins to read one character information bit after another. Such character information is formed not in the form of the pattern as recorded on the recording medium but in the form of coded signals.

Therefore, the character coded signals so read are applied to a character generator 29 comprising a read-only memory (which may be, for example, IC,MCM6571L produced and sold by MOTOROLA, Inc.), thereby providing pattern signals to be recorded on the recording medium. In addition to and simultaneously with the character coded signals, the output from a scanning line counter 31 for counting the number of scanning lines forming a character is applied to the character generator 29, whereby dot outputs on designated scanning lines of a designated character are put out in parallel on an output terminal 30 comprising a plurality of output lines 30-1 to 30-7.

Figure 3:
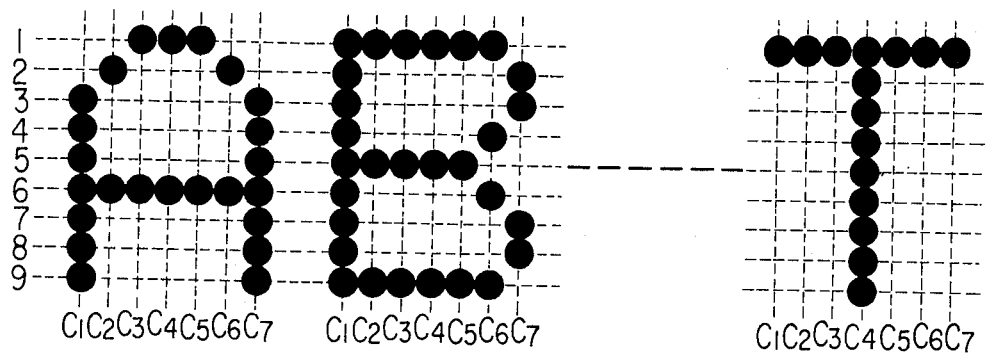
FIG. 3 illustrates the recording patterns achieved by the present invention.

Such a scanning line counter may comprise, for example, a counter which may count the pulses provided by the beam detector 19 and be reset when it has counted a predetermined number of pulses. For example, assuming that the character "A" is depicted by nine scaning lines as shown in FIG. 3, output signals 0011100 are derived on the seven output lines 30-1 to 30-7 by a character "A" coded signal and the information of a first scanning line being applied to the character generator 29.

Such output lines are connected to a memory element forming each bit of a shift register 32 (which requires seven or more bits of memory elements) and thus, the parallel outputs from the character generator 29 are intactly stored in the memory elements of the shift register 32.

Therefore, by applying a shift pulse produced from a shift pulse forming circuit 33, digital signals "0" or "1" may be successively read from the clock signals generated by a clock pulse generator which generates signals of a predetermined frequency in synchronism with the beam as it scans the recording medium in FIG. 1. The output signal from such shift register 32 is applied through a switch 34 to OR gate 35, the output of which is in turn applied to a terminal 36. The terminal 36 is connected to the modulator 13 shown in FIG. 1 and therefore, if the modulator 13 is designed to pass therethrough the laser beam 12 when a digital signal "1" is applied to the terminal 36 and to intercept the laser beam 12 when a digital signal "0" is applied to the terminal 36, the laser beam may be projected in a manner to form a character as shown in FIG. 3, for example. When the reading of the dot signals forming a scanning line of a character stored in the shift register 32 has been completed in this manner, a signal representing such completion is applied through a signal line 37 to the read control circuit 26 to thereby effect reading of the next character information from the store 23. More specifically, such shift pulse forming circuit 33 contains therein a counter for counting and detecting a predetermined number of shift pulses, say, ten shift pulses having been derived, and the output of such a counter is applied through the signal line 37 to the read control 26 to instruct it to read out the next character.

When the reading of the dot output for a scanning line of a character has been completed in this manner, the store 23 is instructed to read the next character and the character information so read out is applied to the character generator 29 while, at the same time, the number of the scanning line (this number is invariable until the beam completes one scanning) is applied to the character generator 29, whereby dot signals are applied to the shift register 32 in the manner as already described and such dot signals are successively read by shift pulses being applied.

When the reading of the information in one line has been completed in this manner, the reading of the character information forming this line is repeated. In this case, however, the reading is effected of the second scanning line and therefore, the signals of the second scanning line are being applied from the scanning line counter 31 to the character generator 29.

Thus, assuming that the character information in a line is formed by characters A, B, . . . , T, these characters A, B, . . . , T are successively read from the store while the first scanning line is being counted by the scanning line counter 31 and, when the first scanning has been completed, the scanning line counter 31 becomes ready to count the second scanning line so that the characters A, B, . . . , T are again read from the store 23 in succession and, when the reading-out has been completed, the scanning line counter 31 is instructed to count the third scanning line. Similar operations recur until the character information "T" in the ninth scanning line has been read, whereupon the recording of the characters in one line is completed. Thus, the reading of the characters in one line is repeated nine times, whereby the reading of the recorded information of all characters forming one line is completed. It is needless to say that the scanning line counter is reset upon completion of the reading of one line.

The character information system as described above may be the one disclosed in our U.S. Patent Application Ser. No. 616,675 previously filed.

Now, the form information system 21 will be described in greater detail. Designated by 38 is a second sensing circuit for reading information from an ultramicro storage medium 38-1, such as a magnetic tape cassette, flexible magnetic sheet or the like.

Since such a ultramicro memory medium only needs to store the form of a recording medium of a predetermined size (for example, the form corresponding to one page of A4-size) in one cassette or one sheet, it may be replaced by a hologram memory or the like which may achieve such a purpose.

Also, for the simplification and reduced cost of the apparatus, and further for the ease of operation, the ultramicro storage medium may preferably be made into an endless form and for example, the "endless data memory" produced and sold by Canon, K.K. is suitable.

Such form information system 21 has two different form (pattern) generator means, one of which is a pattern generator 43 in which patterns (forms) of high frequency of use are prestored so that addresses may be designated by pattern coded signals for such patterns and by the number of scanning lines to thereby derive dot signals (the pattern generator 43 is comprised of a read-only memory or the like as is the character generator 29) and the other is a variable pattern generator 41 which does not require patterns of less high frequency of use to be prestored in the form information system 21 but which reads and stores such patterns from the second storage medium 38-1 each time the second storage medium 38-1 is sensed by the second sensing circuit 38.

Thus, the second storage medium has two different types of information prestored therein, one of which is the pattern coded signal for accessing the pattern generator 43 and the variable pattern generator 41 and the other is the bit pattern signal for causing the variable pattern generator 41 to effect storage.

Figure 4A:
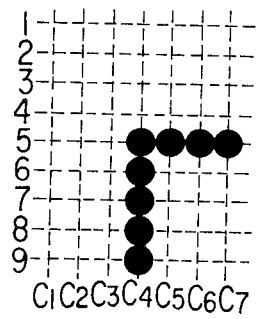
FIGS. 4A and B illustrate the patterns stored in the pattern generator in the present invention.
Figure 4B:
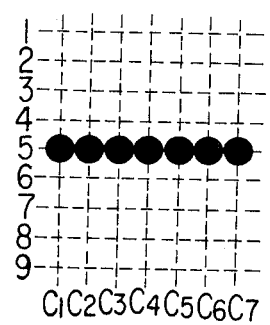

Such a coded signal will more fully be considered. For example, the forms shown in FIGS. 4A and B are frequently used to form a frame on the recording paper and they are the patterns commonly used by many users and therefore, by having such patterns prestored in the pattern generator, the pattern coded signals designating the respective patterns, e.g. 00000001 and 00000010 may be applied to the pattern generator 43 while, at the same time, a signal representing the scanning line may be applied thereto from the scanning line counter 31, whereby the dot signals on the designated scanning line may be derived in parallel on output lines 44-1 to 44-7.

The pattern coded signals include those for accessing the pattern generator 43 as well as those for accessing the variable pattern generator 41, and these may be designed such that the variable pattern generator 41 is accessed when the most significant bit of, for example, an 8-bit coded signal is at high level and the pattern generator 43 is accessed when said most significant bit is at low level.

The variable pattern generator 41 is directed to storing the bit pattern signals read from the second sensing circuit 38 and this may be accomplished in the manner which will be described below.

Figure 5A:
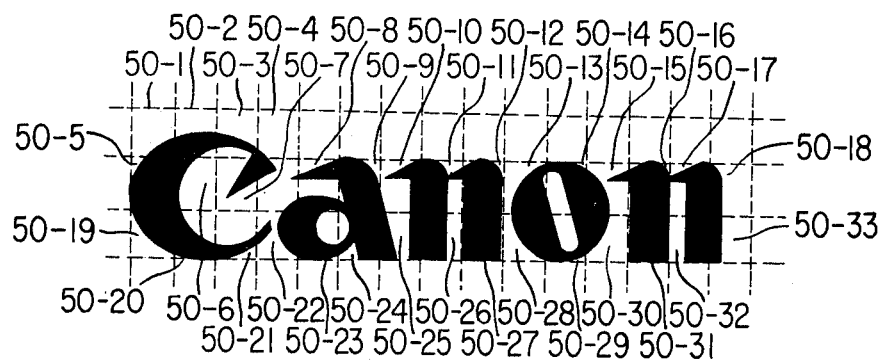
FIG. 5A shows a pattern stored in the variable pattern generator in the present invention.
Figure 5B:
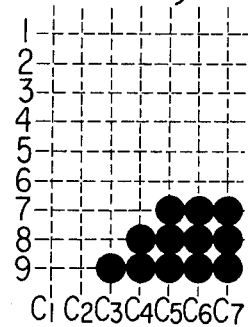
FIGS. 5B and C are enlarged views of portions of the pattern shown in FIG. 5A.
Figure 5C:
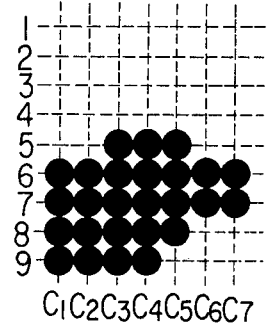

The characters forming the trademark "Canon" as shown in FIG. 5A are of a special style in which the individual regions 50-1 to 50-33 encircled by dotted lines are regarded as individual patterns, each of which is resolved into 7 × 9 dots as in FIG. 3. These dots of the patterns themselves (bit patterns) are prestored in the memory medium in order of the scanning lines and of the columns and thus, they are successively stored into the variable pattern generator in such a manner that the pattern 50-1 shown in FIG. 5B is stored at the address 10000000 and the pattern 50-2 shown in FIG. 5C is stored at the address 10000001.

When all the patterns have been thus stored, the pattern generator 43 and the variable pattern generator 41 become entirely similar so that, in accessing the same, the dot signals forming the patterns may be read in the same manner as that described with respect to the character information system by designating the address for a pattern and the number of the scanning line at a time. Thus, the information read by the second sensing circuit include two types of pattern signals, namely, the pattern coded signals and the bit pattern signals, and these must be distinguished from each other. Such distinction may be accomplished either by incorporating a distinguishable discrimination signal in said signals or by distinguishing the signals in such a manner that the first half 9K bytes read from the recording medium are the coded signals and the latter half 9K bytes are the bit pattern signals.

Among the information read-out by the second sensing circuit 38, the pattern coded signals are successively stored into the second store 40 similar in construction to the store 23 in the character information system 20 under the control of the write control 39 and the bit pattern signals are stored into the variable pattern generator 41 comprising a random access memory.

After the reading has been so completed, read-out instruction is given by the read control circuit 26, whereby the pattern coded signals are successively read from the store 40 and the pattern generator 43 or the variable pattern generator 41 is accessed by the pattern coded signals so read out while, at the same time, the number of scanning lines is applied from the scanning line counter 31 so that dot signals on the selected line of the selected pattern are put out on the respective signal lines. For example, if the pattern coded signals 00000001 are read out on the signal line 27 and the number of scanning lines "5" is derived from the scanning line counter 31, dot signals 0001111 are obtained on the output lines 44-1 to 44-7 of the pattern generator 43; if the pattern coded signals 10000000 are read out on the signal line 27 and the number of scanning lines "7" is derived from the scanning line counter 31, dot signals 0000111 are obtained on the output lines 45-1 to 45-7 of the variable pattern generator 41.

Those of such output lines 44 and 45 which correspond to each other are connected together in the OR circuits 46 (which are shown as wired OR circuits), so that the ORed outputs (combined outputs) of the pattern generator 43 and the variable pattern generator 41 appear on the OR output lines 47-1 to 47-7.

Such OR output lines 47-1 to 47-7 are connected to the memory elements (at least seven or more) forming the shift register 48 similar in construction to the aforementioned shift register 32 to apply the ORed outputs to these memory elements in parallel.

Thus, by the shift pulse from the shift pulse forming circuit 33 being applied to such shift register 48, dot signals may be successively derived in the same manner as that described with respect to the character information system. Therefore, by driving the character information system 20 and the form information system 21 at a time with the stores 23 and 40 having stored information therein, dot signals may be obtained from the respective shift registers 32 and 48. These dot signals may be mixed together by the OR gate 35 and the mixed output thereof may be derived at the terminal 36. Since such terminal 36 is electrically connected to the modulator 13 to enable the beam to be modulated by the dot signals of the character information and the form information, the character information and the form information may be recorded on the recording medium at the same time.

Figure 2:
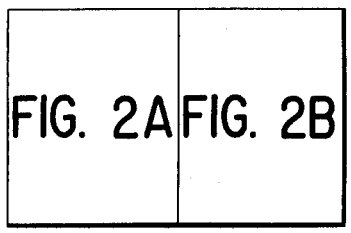
FIG. 2 is a position chart for FIGS. 2A and B.
Figure 2B:
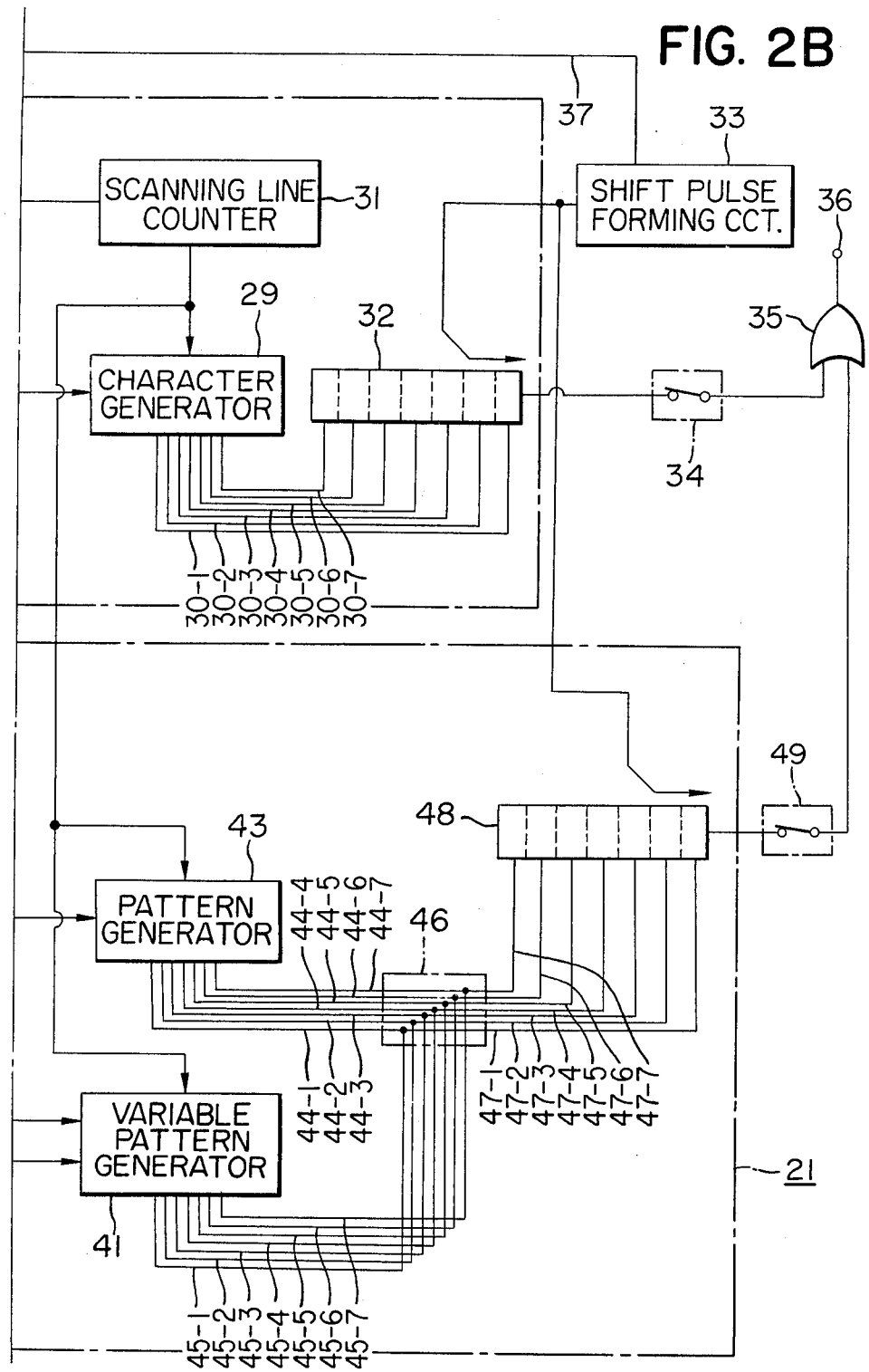

It is further to be noted that switches 34 and 49 are provided as shown in FIG. 2, so that the modulator 13 may be driven by the form information alone when the switch 34 is opened but the switch 49 is closed and the modulator 13 may be driven by the character information alone when the switch 34 is closed but the switch 49 is opened.

The above embodiment has been described with respect to a recording apparatus in which the recording medium is scanned by a beam to effect recording, but the present invention is also applicable to a recording apparatus such as a CRT printer, multistylus printer or dot matrix printer in which recording is accomplished by accumulation of dots.

In the superposition recording apparatus according to the present invention, as has hitherto been described, a read arrangement for reading form information is provided entirely separately from the read arrangement for reading character information and this increases the degree of freedom with which form information is generated. Therefore, the storage medium for character information may be endowed with interchangeability with conventional storage mediums.

Also, the storage medium for storing form information therein may be made to take the form corresponding to one page of one pack (cassette), so that the change of form only requires interchange of pack and this means great simplicity of use.

Figure 6:
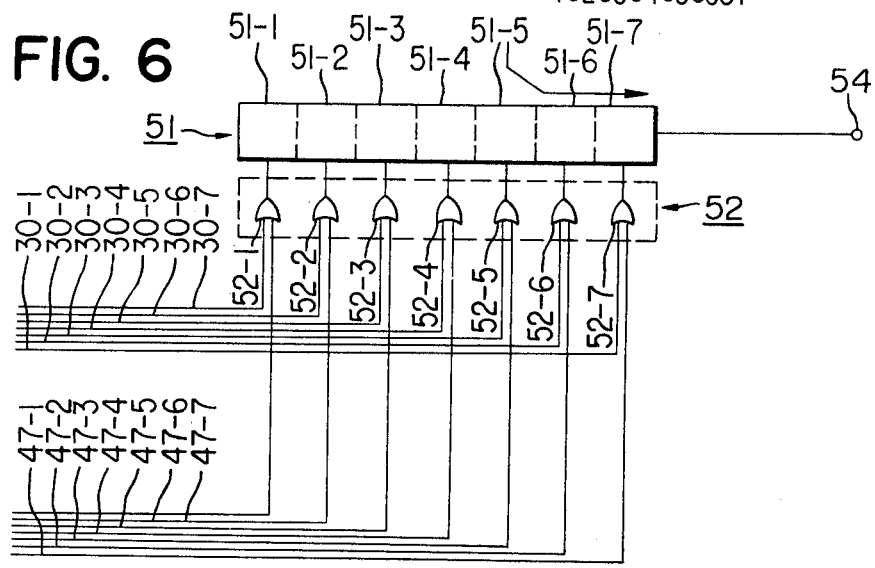
FIG. 6 is a circuit diagram showing the superposition recording apparatus according to another embodiment of the present invention.

In FIG. 2, the dot signals provided by the character generator 29 (the first dot signal generator means) are applied to the shift register 32 and the outputs of the pattern generator 43 (the second dot generator means) and the variable pattern generator 41 (the third dot signal generator means) are added together in the OR circuit 46, whereafter they are applied to the shift register 48, and then the outputs of these shift registers 32 and 48 are added together in the OR circuit 35, whereby the outputs of the character generator 29, the pattern generator 43 and the variable pattern generator 41 are added together. However, instead of using the two shift registers to add together the outputs of the three dot signal generator means, a single shift register may be used. As shown in FIG. 6, the outputs of those of the output lines which correspond to the output lines 30-1 to 30-7 and 47-1 to 47-7 in FIG. 2 may be applied to OR circuits 52-1 to 52-7, the outputs of which may in turn be applied to memory elements 51-1 to 51-7 forming a single shift register 51, to which is also applied the shift pulse from the shift register 33 through a signal line 53, whereby the output of the shift register 51 may be derived at a terminal 54 functionally similar to the terminal 36. Thus, only one shift register is required if the design is made such that the dot signals from the pattern generator 43, the variable pattern generator 41 and the character generator 29 are all added together and then applied to the shift register. In FIG. 6, it will be noted that the portions not shown there are similar in construction to those shown in FIG. 2.

What is claimed is:

1. A superposition recording apparatus comprising:
   first read-out means for reading first coded information from a first storage medium, the first coded information corresponding to information to be recorded on a recording medium as first pattern information;
   first memory means for storing the first coded information read out by said first read-out means;
   first dot signal generator means responsive to the first coded information from said first memory means for producing dot signals;
   second read-out means for reading out second coded information from a second storage medium, the information so read out being usable for recording second pattern information on the recording medium;
   second memory means for storing the second coded information read out by said second read-out means;
   second dot signal generator means responsive to the second coded information from said second memory means for producing dot signals; and
   recording signal forming means for combining together the dot signals produced by said first and second dot signal generator means to form recording signals for successively controlling formation of said first and second pattern information on the recording medium.

2. A superposition recording apparatus according to claim 1, wherein said recording signal forming means includes:
   first and second store means for storing therein the dot signals produced by said first and second dot signal means, respectively; and
   combining means for successively reading out and combining the contents of said first and second store means to form said recording signals.

3. A superposition recording apparatus according to claim 2, wherein said first and second store means comprise first and second shift registers.

4. A superposition recording apparatus according to claim 3, further comprising a shift pulse generator for producing shift pulses to be applied to said first and second shift registers.

5. A superposition recording apparatus according to claim 2, further comprising:
   beam generating means responsive to the recording signals from said recording signal forming means for producing a beam modulated with said recording signals;
   deflector means for deflecting the beam; said
   a recording medium on which the deflected beam is projected.

6. A superposition recording apparatus comprising:
   first read-out means for reading first coded information from a first storage medium, the first coded information corresponding to information to be recorded on a recording medium as first pattern information;
   first memory means for storing the first coded information read out by said first read-out means;
   first dot signal generator means responsive to the first coded information from said first memory means for producing dot signals;
   second read-out means for reading out second coded information and dot pattern information indicative of a dot array from a second storage medium, the information so read out being usable for recording second pattern information on the recording medium;
   second memory means for storing the second coded information read out by said second read-out means;
   second dot signal generator means responsive to second coded information from said second memory means for producing dot signals;
   third dot signal generator means for storing the dot pattern information read out by said second read-out means to produce dot signals upon application thereto of second coded information from said second memory means; and
   recording signal forming means for combining together the dot signals produced by said first dot signal generator means with dot signals produced by one of said second and third dot signal generator means to form recording signals for successively controlling formation of said first and second pattern information on the recording medium.

7. A superposition recording apparatus according to claim 6, wherein said recording signal forming means comprises:
   combining means for combining together the dot signals produced by said first, second and third dot signal generating means, respectively; and
   store means for storing the output of said combining means and for reading out the contents so stored to form said recording signals.

8. A superposition recording apparatus according to claim 7, wherein said store means comprises a shift register.

9. A superposition recording apparatus according to claim 7, further comprising:
   beam generating means responsive to the recording signals from said recording signal forming means for producing a beam modulated with said recording signals;
   deflector means for deflecting the beam; and
   a recording medium on which the deflected beam is projected.

10. A superposition recording apparatus comprising:
   first read-out means for reading out first coded information from a first storage medium, the first coded information corresponding to information to be recorded on a recording medium as first pattern information;
   first memory means for storing the first coded information read out by said first read-out means;
   first dot signal generator means responsive to the first coded information from said first memory means and to a scanning line signal for simultaneously producing dot signals for the designated line of said first pattern information;
   second read-out means for reading out second coded information and dot pattern information indicative of a dot array from a second storage medium, the information so read out being usable for recording second pattern information on the recording medium;

second memory means for storing the second coded information read out from said second read-out means;

second dot signal generator means responsive to second coded information from said second memory means and to a scanning line signal for simultaneously producing dot signals for the designated line of said second pattern information;

third dot signal generator means for storing the dot pattern information read out from said second read-out means and responsive to second coded information from said second memory means and to a scanning line signal for simultaneously producing dot signals for the designated line of said second pattern information; and recording signal forming means for combining together the dot signals produced by said first dot signal generator means with dot signals produced by one of said second and third dot signal generator means to form recording signals for successively controlling formation of said first and second pattern information on the recording medium.

11. A superposition recording apparatus according to claim 10, further comprising:
scanning line signal generator means for applying a common scanning line signal to said first, second and third dot signal generator means.

12. A superposition recording apparatus according to claim 11, wherein said recording signal forming means comprises:
combining means for combining together the dot signals from said first, second and third dot signal generator means; and
store means for storing the output of said combining means and for reading out the contents so stored to form said recording signals.

13. A superposition recording apparatus comprising:
first read-out means for reading out first coded information from a first storage medium, the first coded information corresponding to information to be recorded on a recording medium as first pattern information;
first memory means for storing the first coded information read out by said first read-out means;
first dot signal generator means responsive to the first coded information from said first memory means for producing dot signals;
first store means for storing the dot signals from said first dot signal generator means;
second read-out means for reading out second coded information the dot pattern information indicative of a dot array from a second storage medium, the information so read out being usable for recording second pattern information on the recording medium;
second memory means for storing the second coded information read out by said second read-out means;
second dot signal generator means responsive to second coded information from said second memory means for producing dot signals;
third dot signal generator means for storing the dot pattern information read out by said second read-out means for producing dot signals upon application thereto of second coded information from said second memory means;
first combining means for combining together the dot signals produced by said second and third dot signal generator means;
second store means for storing the combined output of said first combining means; and
second combining means for successively reading out and combining together the information stored in said first and second store means to form recording signals for controlling formation of said first and second information on the recording medium.

14. A superposition recording apparatus according to claim 13, wherein said first and said second store means comprise first and second shift registers.

15. A superposition recording apparatus according to claim 13, further comprising:
first switch means provided between said first store means and said second combining means to control the application to said second combining means of the information stored in said first store means.

16. A superposition recording apparatus according to claim 13, further comprising:
second switch means provided between said second store means and said second combining means to control the application to said second combining means of the information stored in said second store means.

17. A superposition recording apparatus according to claim 13, further comprising:
beam generating means to which the recording signals from said recording signal forming means are applied to thereby produce a beam modulated with said recording signals;
deflector means for deflecting the beam; and
a recording medium on which the deflected beam is projected.

18. A superposition recording apparatus comprising:
first read-out means for reading out first coded information from a first storage medium, the first coded information corresponding to information to be recorded on a recording medium as first pattern information;
first memory means for storing the first coded information read out by said first read-out means;
first dot signal generator means responsive to the first coded information from said first memory means and to a scanning line signal for simultaneously producing dot signals for the designated line of said first pattern information;
first store means for storing the dot signals from said first dot signal generator means;
second read-out means for reading second coded information and dot pattern information indicative of an array from a second storage medium, the information so read out being usable for recording second pattern information on the recording medium;
second memory means for storing the second recording information read out by said second read-out means;
second dot signal generator means responsive to second coded recording information from said second memory means and to a scanning line signal for simultaneously producing dot signals for the designated line of said second pattern information;
third dot signal generator means for storing the dot pattern information read out by said second read-out means and responsive to second coded recording information from said second memory means and to a scanning line signal for simultaneously producing dot signals for the designated line of said second pattern information;

first combining means for combining together the dot signals produced by said second and third dot signal generator means;

second store means for storing the combined output of said first combining means; and second combining means for successively reading out the information stored in said first and second store means to form recording signals for controlling formation of said first and second pattern information on the recording medium.

19. A superposition recording apparatus according to claim 18, further comprising:

beam generating means to which the recording signals from said recording signal forming means are applied to thereby produce a beam modulated with said recording signals;

deflector means for deflecting the beam; and a recording medium on which the deflected beam is projected.

20. A superposition recording apparatus comprising:

means for forming first signals to be recorded as first pattern information on a recording medium;

read-out means for reading out from a storage medium coded information and dot pattern information representative of a dot array, the information so read out being usable for recording second pattern information on the recording medium;

memory means for storing the coded information read out by said read-out means;

a dot signal generator means responsive to coded information from said memory means and to a scanning line signal for producing dot signals for the designated line of the first pattern information;

a further dot signal generator means for storing the dot pattern information read out by said read-out means and responsive to coded information from said memory means and to a scanning line signal for producing dot signals for the designated line of the first pattern information; and recording signal forming means for combining together the first signals from said signal forming means and the dot signals from one of said dot signal generator means to form recording signals for sequentially controlling formation of said first and second pattern information on the recording medium.

21. A superposition recording apparatus comprising:

beam forming means for forming a beam modulated by record signals applied thereto, deflecting means for deflecting said beam along a scanning path, first read-out means for reading out first coded information from a first storage medium, the first coded information corresponding to information to be recorded on a recording medium as first pattern information, first memory means for storing the first coded information read out by said first read-out means, second read-out means for reading out second coded information and dot pattern information indicative of a dot array from a second storage medium, the second coded information so read out being usable for recording second pattern information on the recording medium, second memory means for storing the second coded information read out from said second read-out means, dot signal generator means responsive to the first and second coded information from said first and second memory means and to a scanning line signal for simultaneously producing dot signals in parallel representing the first and second pattern information for the designated line of said second pattern information and for storing the dot pattern information from said second read-out means, converting means for converting the parallel dot signals produced in said dot signal generator means into serial dot signals, and record signal applying means for applying said serial dot signals to said beam forming means.

22. A superposition recording apparatus comprising:

beam forming means for forming a beam modulated by record signals applied thereto, deflecting means for deflecting said beam along a scanning path, first read-out means for reading out first coded information from a first storage medium, the first coded information corresponding to information to be recorded on a recording medium as first pattern information, first memory means for storing the first coded information read out by said first read-out means, dot signal generator means responsive to the first coded information from said first memory means and to a scanning line signal for simultaneously producing dot signals for the designated line of said first pattern information, second read-out means for reading out second coded information and dot pattern information indicative of a dot array from a second storage medium, the second coded information so read out being usable for recording second pattern information on the recording medium, second memory means for storing the second coded information read out from said second read-out means, form dot signal generator means responsive to the second coded information from said second memory means and to a scanning line signal for simultaneously producing dot signals for the designated line of said second pattern information and storing the dot pattern information from said second read-out means, recording signal forming means for combining together the dot signals produced by said dot signal generator means with dot signals produced by said form dot signal generator means to form recording signals for successively controlling formation of said first and second pattern information on the recording medium, and record signal applying means for applying said recording signals to said beam forming means.

* * * * *

UNITED STATES PATENT AND TRADEMARK OFFICE
CERTIFICATE OF CORRECTION

PATENT NO. : 4,081,604
DATED : March 28, 1978
INVENTOR(S) : KIYOSHI KANAIWA

It is certified that error appears in the above-identified patent and that said Letters Patent are hereby corrected as shown below:

Column 3, line 54, "surface" should read --surfaces--;

Column 3, line 59, "which" should read --while--;

Column 5, line 2, "scaning" should read --scanning--;

Column 9, line 62, "said" should read --and--;

Column 11, line 55, "the" should read --and--

Signed and Sealed this

Eighth Day of August 1978

[SEAL]

Attest:

RUTH C. MASON
*Attesting Officer*

DONALD W. BANNER
*Commissioner of Patents and Trademarks*